United States Patent
Jallouli

(10) Patent No.: US 12,420,503 B2
(45) Date of Patent: Sep. 23, 2025

(54) LATE-STAGE CATALYSIS OF FAST ROOM-TEMPERATURE POLYMERIZATIONS

(71) Applicant: ESSILOR INTERNATIONAL, Charenton-le-Pont (FR)

(72) Inventor: Aref Jallouli, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 18/841,134

(22) PCT Filed: Mar. 29, 2023

(86) PCT No.: PCT/EP2023/058111
§ 371 (c)(1),
(2) Date: Aug. 23, 2024

(87) PCT Pub. No.: WO2023/186966
PCT Pub. Date: Oct. 5, 2023

(65) Prior Publication Data
US 2025/0108574 A1    Apr. 3, 2025

(30) Foreign Application Priority Data
Mar. 31, 2022 (EP) ................................. 22165819

(51) Int. Cl.
| | |
|---|---|
| B29D 11/00 | (2006.01) |
| B29C 33/56 | (2006.01) |
| B29C 39/00 | (2006.01) |
| B29C 39/02 | (2006.01) |
| B29K 75/00 | (2006.01) |
| B29K 105/00 | (2006.01) |

(52) U.S. Cl.
CPC ........ B29D 11/00442 (2013.01); B29C 33/56 (2013.01); B29C 39/006 (2013.01); B29C 39/021 (2013.01); *B29K 2075/00* (2013.01); *B29K 2105/0002* (2013.01); *B29K 2105/0014* (2013.01); *B29K 2105/0094* (2013.01)

(58) Field of Classification Search
CPC . B29D 11/00442; B29C 33/56; B29C 39/006; B29C 39/021; B29K 2075/00; B29K 2105/0002; B29K 2105/0014; B29K 2105/0094
See application file for complete search history.

(56) References Cited

U.S. PATENT DOCUMENTS

| | | | | |
|---|---|---|---|---|
| 4,744,035 A | * | 5/1988 | Hashim ..................... | D06H 3/16 209/939 |
| 5,551,663 A | * | 9/1996 | Bae ......................... | B29C 33/40 427/508 |
| 5,973,098 A | * | 10/1999 | Keita ................. | C08G 18/0852 528/65 |
| 6,086,799 A | * | 7/2000 | Buazza ............ | B29D 11/00442 425/808 |
| 6,174,155 B1 | * | 1/2001 | Buazza ............... | B29C 35/0894 425/808 |
| 6,844,415 B1 | * | 1/2005 | Keita ..................... | G02B 1/041 528/65 |
| 6,887,401 B2 | * | 5/2005 | Keita ................. | C08G 18/3876 264/1.32 |
| 2002/0055007 A1 | | 5/2002 | Soane et al. | |
| 2003/0100641 A1 | | 5/2003 | Jiang et al. | |
| 2003/0125410 A1 | | 7/2003 | Keita et al. | |

(Continued)

FOREIGN PATENT DOCUMENTS

| | | |
|---|---|---|
| CN | 101312811 A | 11/2008 |
| EP | 0727304 A2 | 8/1996 |
| EP | 1314746 A2 | 5/2003 |
| JP | 2004001341 A | 1/2004 |
| JP | 2004530780 A | 10/2004 |
| KR | 101817883 B1 | 1/2018 |

OTHER PUBLICATIONS

International Search Report and Written Opinion of the ISA for PCT/EP2023/058111 dated Jun. 28, 2023, 8 pages.
Office Action and Search Report, issued in Chinese Patent Application No. 202380026410.0 dated Apr. 11, 2025.

*Primary Examiner* — Jeffrey M Wollschlager
(74) *Attorney, Agent, or Firm* — NIXON & VANDERHYE

(57) ABSTRACT

The present application relates to a method of fast curing transparent casted substrate, usable for making optical articles such as ophthalmic lenses, which comprises the steps of:—providing a fast room-temperature polymerizable composition:—providing a catalyst composition;—providing a casting mold assembly containing two unsealed molds each having an inside surface and an outside surface; and optionally providing a light filtering element placed or configured to be placed between the two molds—depositing the catalyst composition:—on the inside surfaces of at least one of the molds; and/or—on at least one of the surfaces of the light filtering element which is thereafter positioned in the mold assembly;—closing the casting mold assembly so that the inside surfaces of the molds form together the molding cavity:—filling the fast room-temperature polymerizable composition in the molding cavity of the casting mold assembly already containing the catalyst composition deposited on the inside surface of at least one of the molds:—curing the filled mold assembly to obtain a transparent solid substrate, said curing step comprising: a) a first step for polymerizing said composition at room temperature to obtain a gel; and b) a second step of post-curing the gel to obtain the transparent solid substrate; and—recovering the transparent solid substrate from the casting mold assembly.

14 Claims, No Drawings

(56) References Cited

U.S. PATENT DOCUMENTS

| | | |
|---|---|---|
| 2003/0176561 A1 | 9/2003 | Joshi et al. |
| 2003/0183960 A1* | 10/2003 | Buazza ................ G03F 7/0005 |
| | | 425/808 |
| 2006/0065989 A1* | 3/2006 | Druffel ............ B29D 11/00865 |
| | | 264/1.32 |
| 2007/0138667 A1 | 6/2007 | Dang et al. |
| 2007/0202265 A1* | 8/2007 | Berzon ............. B29D 11/0073 |
| | | 427/407.1 |
| 2008/0281014 A1* | 11/2008 | Momose ................ B29C 39/26 |
| | | 524/496 |
| 2009/0202714 A1* | 8/2009 | Mandzy ................ B82Y 30/00 |
| | | 427/164 |
| 2011/0063568 A1* | 3/2011 | Meng ............. B29D 11/00317 |
| | | 264/1.7 |
| 2011/0262755 A1 | 10/2011 | Panther |
| 2016/0282515 A1 | 9/2016 | Tsukada et al. |
| 2020/0241174 A1* | 7/2020 | Fromentin ............... G02B 1/14 |

\* cited by examiner

LATE-STAGE CATALYSIS OF FAST ROOM-TEMPERATURE POLYMERIZATIONS

CROSS-REFERENCE TO RELATED APPLICATIONS

This application is the U.S. national phase of International Application No. PCT/EP2023/058111 filed Mar. 29, 2023 which designated the U.S. and claims priority to EP 22165819.8 filed Mar. 31, 2022, the entire contents of each of which are hereby incorporated by reference.

FIELD

The current invention provides a method of fast curing a fast room-temperature polymerizable composition in order to obtain transparent substrates and in particular optical substrates such as lenses, in particular ophthalmic lenses.

BACKGROUND

Transparent plastic substrates are well known and have a common usage in making optical articles such as ophthalmic lenses. Plastic substrates made of a thermoset polymer resulting from the polymerization of a polymerizable composition comprising monomer and/or oligomer which are able to polymerize under thermal activation to form a polymer may be used to manufacture such transparent plastic substrates. Usually in the ophthalmic field, a thermosetting polymer represents a polymer network formed in an irreversible way by the chemical reaction of monomers under thermal activation.

An object of the invention is to obtain transparent plastic substrates usable for making optical articles such as ophthalmic lenses from polymerizable compositions at room temperature. By avoiding thermal activation, the manufacturing method is simplified and becomes more environmentally-friendly, while necessitating less complex devices.

An example of fast room-temperature polymerizable compositions is given in documents U.S. Pat. Nos. 6,887,401 and 5,973,098. Both documents describe a method for making casted transparent polythiourethane substrates usable for making optical articles.

The approaches described in U.S. Pat. Nos. 5,973,098 and 6,887,401 are similar and involve short mixture times of monomers or prepolymers involved in the polymerizing reaction with a catalyst. They describe a method where one of the monomers or prepolymers involved in the polymerizing reaction is first mixed with a catalyst solution, said mixture being then mixed with the remaining monomer or prepolymer in order to form a further mixture which is then immediately filled in a mold cavity.

However, once the catalyst solution is added to one of the monomers or prepolymers, the remaining monomer or prepolymer should be added within a short time to avoid a decrease of its stability. The resulting mixture containing both monomers or prepolymers and the catalyst should also be filled in the mold cavity quickly to avoid any premature gelation during mixing or filling.

There is thus a need to increase the shelf life of fast room-temperature polymerizable compositions.

SUMMARY

The present invention is directed to a method of fast curing transparent casted substrate, usable for making optical articles such as ophthalmic lenses, which comprises the steps of:

providing a fast room-temperature polymerizable composition;
providing a catalyst composition;
providing a casting mold assembly containing two unsealed molds each having an inside surface and an outside surface; and optionally providing a light filtering element placed or configured to be placed between the two molds
depositing the catalyst composition:
  on the inside surfaces of at least one of the molds; and/or
  on at least one of the surfaces of the light filtering element which is thereafter positioned in the mold assembly;
closing the casting mold assembly so that the inside surfaces of the molds form together the molding cavity;
filling the fast room-temperature polymerizable composition in the molding cavity of the casting mold assembly already containing the catalyst composition deposited on the inside surface of at least one of the molds;
curing the filled mold assembly to obtain a transparent solid substrate, said curing step comprising:
a) a first step for polymerizing said composition at room temperature to obtain a gel; and
b) a second step of post-curing the gel to obtain the transparent solid substrate; and
recovering the transparent solid substrate from the casting mold assembly.

According to an embodiment, depositing the catalyst composition on the inside surface of at least one of the molds and/or at least one side of the light filtering element is performed by liquid phase deposition.

According to an embodiment, depositing the catalyst composition on the inside surface of at least one of the molds and/or at least one side of the light filtering element is performed by spin coating, dip coating, spray coating, brush coating, or roller coating.

According to an embodiment, the fast room-temperature polymerizable composition has a viscosity at 25° C. ranging from 0.1 to 0.3 Pa·s.

According to an embodiment, the fast room-temperature polymerizable composition is chosen from a composition comprising:
(a) at least one poly (iso) thiocyanate monomer or liquid NCO- or NCS-terminated poly (thio) urethane prepolymer and at least one polythiol monomer or liquid SH-terminated poly (thio) urethane prepolymer; or
(b) one or more polymerizable episulfide compounds.

According to an embodiment, said mixture (a) comprises:
a first component A comprising a polythiourethane prepolymer having isocyanate or isothiocyanate (NCX where X is O or S) end groups and a viscosity at 25° C. ranging from 0.02 to 0.4 Pa·s with
a second component B comprising a polythiourethane prepolymer having thiol (SH) end groups and a viscosity at 25° C. ranging from 0.2 to 2.0 Pa·s,
wherein components A and B are obtained by polymerizing at least one polyisocyanate or polyisothiocyanate monomer and at least one polythiol monomer.

According to an embodiment, the amounts of polyisocyanate or polyisothiocyanate monomers and polythiol monomers are adapted so that the ratio NCX/SH for the mixture of polyisocyanate or isothiocyanate monomers and polythiol monomers is ranging from 4:1 to 30:1 for the obtention of component A and the ratio SH/NCX for the mixture of polyisocyanate or isothiocyanate monomers and the polythiol monomers is ranging from 4:1 to 30:1 for the obtention of component B.

According to an embodiment, the polythiol has formula: R'(SH)n' in which n' is an integer from 2 to 6 and preferably 3 to 4, and R' is an organic group of valency equal to n'.

According to an embodiment, the polythiol is selected from the group consisting of pentaerythritol tetrakis mercaptoproprionate, 1-(1'mercaptoethylthio)-2,3-dimercaptopropane, 1-(2'-mercaptopropylthio)-2,3-dimercaptopropane, 1-(-3'mercaptopropylthio)-2,3 dimercaptopropane, 1-(-4'mercaptobutylthio)-2,3 dimercaptopropane, 1-(5'mercaptopentylthio)-2,3 dimercapto-propane, 1-(6'-mercaptohexylthio)-2,3-dimercaptopropane, 1,2-bis(-4'-mercaptobutylthio)-3-mercaptopropane, 1,2-bis(-5'mercaptopentylthio)-3-mercaptopropane, 1,2-bis(-6'-mercaptohexyl)-3-mercaptopropane, 1,2,3-tris(mercaptomethylthio)propane, 1,2,3-tris(-3'-mercaptopropylthio)propane, 1,2,3-tris(-2'-mercaptoethylthio)propane, 1,2,3-tris(-4'-mercaptobutylthio) propane, 1,2,3-tris(-6'-mercaptohexylthio)propane, methanedithiol), 1,2-ethanedithiol, 1,1-propanedithiol, 1,2-propanedithiol, 1,3-propanedithiol, 2,2-propanedithiol, 1,6-hexanethiol-1,2,3-propanetrithiol, and 1,2-bis(-2'-mercaptoethylthio)-3-mercaptopropane.

According to an embodiment, the polyisocyanate or polyisothiocyanate is selected from monomers of formulas:

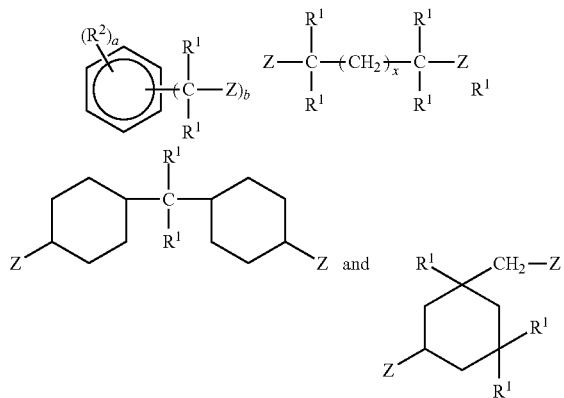

wherein
R1 is independently H or a C1-C5 alkyl group, preferably CH3 or C2H5;
R2 is H, an halogen, preferably Cl or Br, or a C1-C5 alkyl group, preferably CH3 or C2H5;
Z is —N═C═X where X is O or S;
a is an integer ranging from 1 to 4, b is an integer ranging from 2 to 4 and a+b≤6 and
x is an integer from 1 to 10, preferably 1 to 6.

According to an embodiment, the polyisocyanate or isothiocyanate is selected from the group consisting of tolylene diisocyanate or diisothiocyanate, phenylene, diisocyanate or diisothiocyanate, ethylphenylene diisoocyanate, isopropyl phenylene diisocyanate or diisothiocyanate, dimethylphenylene diisocyanate or diisothiocyanate, diethylphenylene diisocyanate or diisothiocyanate, diisopropylphenylene diisocyanate or diisothiocyanate, trimethylbenzyl triisocyanate or triisothiocyanate, xylylene diisocyanate or diisothiocyanate, benzyl triiso(thio)cyanate, 4,4'-diphenyl methane diisocyanate or diisothiocyanate, naphtalene diisocyanate or diisothiocyanate, isophorone diisocyanate or diisothiocyanate, bis(isocyanate or isothiocyanate methyl) cyclohexane, hexamethylene diisocyanate or diisothiocyanate and dicyclohexylmethane diisocyanate or diisothiocyanate.

According to an embodiment, the fast room-temperature polymerizable composition (b) is a composition comprising one or more polymerizable episulfide compounds having two or more moieties of formula:

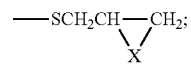

wherein X is S or O.

According to an embodiment, the light filtering element is chosen from a polarizing film, a polarizing laminate, a photochromic film, a photochromic laminate, a near infrared filter, a near infrared laminate, a blue cut filter, a blue cut laminate, a microstructured film and a microstructured laminate.

According to an embodiment, the catalyst composition consists of a compound chosen from tertiary amines, such as triethylamine, organometallic compounds, such as dibutyltin dilaurate, and alkaline metals, alkaline earth metals, transition metals and ammonium salts of acids or mixtures thereof, these salts fulfilling the condition 0.5≤pKa≤14.

The present invention is further directed to an optical article manufactured by the method described above.

More details relating to the various embodiments of the invention will be described in the detailed description part of the invention, without any limitation to the general method described hereinbefore.

DETAILED DESCRIPTION

In the description which follows, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed individually, or in combination to a device and conversely all the technical features relative to a device can be transposes, individually or in combination, to a process.

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

As used herein, polymerization/polymerizing/polymerizable refers to a chemical reaction that produces bonding of two or more monomers and/or oligomers to form a polymer. Polymerization and all grammatical variations include photo-polymerizable and/or thermo-polymerizable compositions. Photo-polymerizable means polymerization which occurs by exposing a composition to activating light. Thermo-polymerizable means polymerization which occurs by exposing the composition to a variation of temperature.

As used herein, curing refers to a chemical process of converting a monomer or a oligomer into a polymer of higher molar mass and then into a network.

As used herein, "monomer" and/or "oligomer" refer to a chemical compound comprising at least a reactive group able to react in the presence of an initiator or a catalyst. More details relating to "reactive group" being involved will be described latter in the present specifications.

As used herein, "prepolymer" refers to a monomer or system of monomers that have been reacted to an intermediate molecular mass state. This material is capable of further polymerization by reactive groups to a fully cured, high molecular weight state. As such, mixtures of reactive polymers with un-reacted monomers may also be referred to as pre-polymers. The term "pre-polymer" and "polymer precursor" may be interchanged.

As used herein, "viscosity" refers to a fluid's resistance to deformation.

As used herein, "fast room-temperature polymerizable composition" or "a fast curing room-temperature polymerizable composition" which may be used interchangeably, represents a composition which cures within 10 minutes or less at room temperature. In other words, the composition gelifies so that a hard gel is obtained after a short time and at room temperature. By formation of a hard gel, one means that the resulting polymerized composition is self-supporting, i.e. is able to withstand its own shape without deformation.

As used herein, an ophthalmic lens is understood to be transparent when the observation of an image through said ophthalmic lens is perceived with no significant loss of contrast, that is, when the formation of an image through said ophthalmic lens is obtained without adversely affecting the quality of the image. This definition of the term "transparent" can be applied, within the terms of reference of the disclosure, to all objects qualified as such in the description.

The rear surface (generally the concave surface) of the lens substrate is the surface of the lens substrate which, in use, is the closest to the wearer's eye. The front surface (generally the convex surface) of the lens substrate is the surface of the lens substrate which, in use, is the farthest from the wearer's eye.

According to a first aspect, the present invention relates to a method of fast curing transparent casted substrate, usable for making optical articles such as ophthalmic lenses, which comprises the steps of:
  providing a fast room-temperature polymerizable composition;
  providing a catalyst composition;
  providing a casting mold assembly containing two unsealed molds each having an inside surface and an outside surface; and optionally providing a light filtering element placed or configured to be placed between the two molds
  depositing the catalyst composition:
    on the inside surfaces of at least one of the molds and/or;
    on at least one of the surfaces of the light filtering element which is thereafter positioned in the mold assembly;
  closing the casting mold assembly so that the inside surfaces of the molds form together the molding cavity;
  filling the fast room-temperature polymerizable composition in the molding cavity of the casting mold assembly already containing the catalyst composition deposited on the inside surface of at least one of the molds;
  curing the filled mold assembly to obtain a transparent solid substrate, said curing step comprising:
    a) a first step for polymerizing said composition at room temperature to obtain a gel; and
    b) a second step of post-curing the gel to obtain the transparent solid substrate; and
  recovering the transparent solid substrate from the casting mold assembly.

The process comprises a step of providing a casting mold assembly containing two unsealed molds each having an inside surface and an outside surface.

The casting mold assembly containing two unsealed molds each having an inside surface and an outside surface serve as a template for the final shape of the substrate. The molding cavity thus defines said final shape. According to an embodiment, it has a curved shape in order to obtain a final substrate having a concave surface and a convex surface. Therefore, the inside surfaces of the two parts of the casting mold are each curved, one showing a convex surface and the other a concave surface. Thus, the inside surfaces of the molds constituting the casting assembly corresponds to the surfaces forming the molding cavity.

Optionally, a light filtering element may be placed between the two molds. The light filtering element may be placed between the two molds, between the inside surfaces of the two molds.

The catalyst composition may be deposited in the molding cavity prior to the addition of the fast room-temperature polymerizable composition in various ways.

According to an embodiment, the catalyst composition is deposited within the molding cavity on one of the inside surfaces of the mold parts forming the mold assembly.

According to an embodiment, the catalyst composition is deposited within the molding cavity on both inside surfaces of the mold parts forming the mold assembly.

According to an embodiment, the catalyst composition is deposited on one face or surface of a light filtering element which is thereafter added within the molding cavity.

According to an embodiment, the catalyst composition is deposited on both surfaces of a light filtering element which is thereafter added within the molding cavity.

According to an embodiment, the catalyst composition is deposited within the molding cavity on one of the inside surfaces of the mold parts forming the mold assembly and on one of the surfaces of a light filtering element which is thereafter added within the molding cavity.

According to an embodiment, the catalyst composition is deposited within the molding cavity on one of the inside surfaces of the mold parts forming the mold assembly and on both surfaces of a light filtering element which is thereafter added within the molding cavity.

According to an embodiment, the catalyst composition is deposited within the molding cavity on both of the inside surfaces of the mold parts forming the mold assembly and on one of the surfaces of a light filtering element which is thereafter added within the molding cavity.

According to an embodiment, the catalyst composition is deposited within the molding cavity on both of the inside surfaces of the mold parts forming the mold assembly and on both surfaces of a light filtering element which is thereafter added within the molding cavity.

According to an embodiment, a light filtering element is first provided between the two mold parts forming the mold assembly. The catalyst composition is then deposited within the molding cavity on either one of the inside surfaces of the mold parts forming the mold assembly.

According to an embodiment, a light filtering element is first provided between the two mold parts forming the mold assembly. The catalyst composition is then deposited within the molding cavity on both inside surfaces of the mold parts forming the mold assembly.

According to an embodiment, a light filtering element is first provided onto one of the inside surfaces of the mold parts forming the mold assembly. The catalyst composition is then deposited within the molding cavity on the remaining inside surface of the mold parts forming the mold assembly.

According to an embodiment, a light filtering element is first provided onto one of the inside surfaces of the mold parts forming the mold assembly. The catalyst composition is then deposited within the molding cavity on the remaining inside surface of the mold parts forming the mold assembly and on the surface of the light filtering element.

According to an embodiment, a light filtering element is first provided onto one of the inside surfaces of the mold parts forming the mold assembly. The catalyst composition is then deposited within the molding cavity on the surface of the light filtering element.

According to an embodiment, depositing the catalyst composition on the inside surface of at least one of the molds and/or at least one side of the light filtering element is performed by liquid phase deposition.

According to an embodiment, depositing the catalyst composition on the inside surface of at least one of the molds and/or at least one side of the light filtering element is performed by spin coating, dip coating, spray coating, brush coating, or roller coating.

Generally, the thickness of the layer of the catalyst composition ranges from 0.5 to 20 µm. According to an embodiment, the thickness of the layer of the catalyst composition ranges from 1 to 20 µm, or from 1 to 5 µm or from 1 to 3 µm.

The compositions of the present disclosure are very reactive at room temperature, and a gel can be obtained within a polymerization time of 1 to 60 minutes. According to an embodiment, compositions of the present disclosure have a short gel time between 1 to 5 minutes.

Therefore, the disclosure concerns a process for making cast substrates, such as optical articles and in particular lenses, without a pot life issue, for example, by mixing the required amounts of each of the ingredients of a composition according to the disclosure as described above, except of the catalyst, just before casting.

A traditional mold comprises two pieces, called herein parts, typically made of mineral glasses, at the periphery of which is disposed an annular closure member, such as a gasket or an adhesive tape, defining with them the required molding cavity.

According to an embodiment, the polymerized composition is self-supporting in the mold assembly when the annular closure of the two part mold assembly has been removed.

Typically filling of the molding cavity is effected using a pipe connected to a pressurized molding material reservoir and applied, like a filling nozzle, to the casting opening. A syringe filing can be used coupled to an electrical device or pneumatic device. By this way, exact amounts of the composition can be easily adjusted and fixed for precise delivery. With such a method, it is possible to start polymerization immediately after filling.

After a short time at room temperature a gel is obtained. Gel formation inside the mold is effected at room temperature and has a duration ranging from 1 to 60 minutes, or from 1 minute to less than 15 minutes and is generally about 10 minutes, although shorter gel time of 1 to 5 minutes may still be preferable.

Afterwards, the gel is cured at elevated temperature in an oven in order to complete polymerization, for example an air oven, is generally effected at a temperature ranging from 50 to 150° C., or from 100 to 130° C. and lasts usually for 2 to 4 hours. According to an embodiment, the mold assembly is placed in an air oven and heated at 120° C. for 2 hours.

Thereafter, the mold assembly is withdrawn from the oven, the annular closure member is removed, and the mold parts disassembled to recover the substrate. The recovered substrate or article can then be edge machined to obtain a finished lens.

Thereafter the substrate or article can be tinted, coated to improve the scratch resistance, and an antireflective treatment can also be added. Furthermore, microstructured films and laminates may be added as explained hereinafter.

The Fast Room-Temperature Polymerizable Composition Useful for the Present Disclosure According to an embodiment, the fast room-temperature polymerizable composition has a viscosity at 25° C. ranging from 0.1 to 0.3 Pa·s.

One major problem associated with moulding methods, especially for making optical substrates such as ophthalmic lenses, is the obtention of a defect free substrate, in particular free from striations. If the liquid monomer mixture is of relatively low viscosity, i.e. less than 3.10-3 Pa·s at 25° C., time to gelation is relatively long. In that case, local heat points appearing within the mixture during polymerization create convection currents resulting in the so-called "convection induced striations" within the final polymerized substrate.

The rate of formation of such convection induced striations increases when the mixture viscosity decreases. On the other hand, the mere filling of the mould cavity with the monomer mixture creates the so-called "filling induced striations". The relaxation time necessary to eliminate such filling induced striations increases with the increase of the monomer mixture viscosity.

Furthermore, when using monomer mixtures of relatively high viscosity, air bubbles which may be entrapped within the liquid monomer mixtures are difficult to eliminate.

As a result, the fast room-temperature polymerizable composition according to the present disclosure having a viscosity at 25° C. ranging from 0.1 to 0.3 Pa·s. allows to obtain a transparent casted substrate which remedies the drawbacks of the prior art methods and is thus substantially free from optical defects, in particular free from convection and/or filling induced striations.

According to the present disclosure, the fast room-temperature polymerizable composition is chosen from a composition comprising:
(a) at least one poly (iso) thiocyanate monomer or liquid NCO- or NCS-terminated poly (thio) urethane prepolymer and at least one polythiol monomer or liquid SH-terminated poly (thio) urethane prepolymer; or
(b) one or more polymerizable episulfide compounds.

Accordingly, the fast room-temperature polymerizable composition (a) is a mixture chosen from:
(i) at least one poly (iso) thiocyanate monomer and at least one polythiol; or
(ii) a mixture of at least one liquid NCO- or NCS-terminated poly (thio) urethane prepolymer and at least one liquid SH-terminated poly (thio) urethane prepolymer or
(iii) at least one poly (iso) thiocyanate monomer and at least one liquid SH-terminated poly (thio) urethane prepolymer; or
(iv) at least one polythiol and at least one liquid NCO- or NCS-terminated poly (thio) urethane prepolymer.

Mixture (a)(i)

According to an embodiment, the fast room-temperature polymerizable composition is chosen from at least one poly(iso)thiocyanate monomer and at least one polythiol.

As used herein, the poly(iso)thiocyanate monomer relates to either polyisocyanate or polyisothiocyanate monomers.

The fast room-temperature polymerizable composition containing at least one poly(iso)thiocyanate monomer and at least one polythiol has a viscosity at 25° C. ranging from 0.1 to 0.3 Pa·s.

The NCX/SH and SH/NCX ratios are ranging from 6:1 to 10:1. The amounts of polyisocyanate or polyisothiocyanate monomers and polythiol monomers are adapted so that the ratio NCX/SH for the mixture of polyisocyanate or isothiocyanate monomers and polythiol monomers is ranging from 4:1 to 30:1. The NCX/SH and SH/NCX ratios may be ranging from 6:1 to 10:1.

The polyisocyanate or isothiocyanate monomers can be any polyisocyanate or isothiocyanate monomer having two or more isocyanate or isothiocyanate functions per molecule, or two or three isocyanate or isothiocyanate functions or two isocyanate or isothiocyanate functions.

According to an embodiment, polyisocyanate or isothiocyanate monomers are those having the formulae:

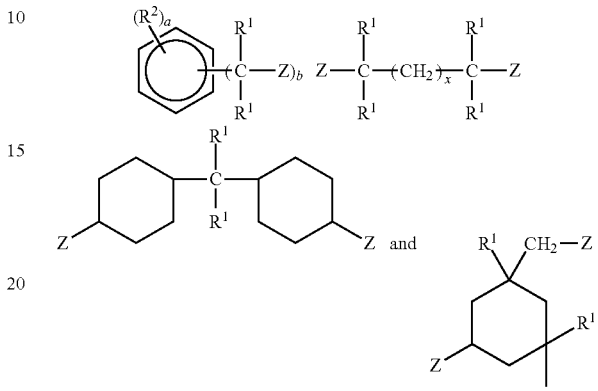

wherein
$R^1$ is independently H or a $C_1$-$C_5$ alkyl group;
$R^2$ is H, an halogen or a $C_1$-$C_5$ alkyl group;
Z is —N=C=X, with X being O or S;
a is an integer ranging from 1 to 4, b is an integer ranging from 2 to 4 and a+b≤6; and
x is an integer from 1 to 10.

According to an embodiment, R1 is independently a CH3 or C2H5.

According to an embodiment, R2 is chlore or brome.
According to an embodiment, R2 is CH3 or C2H5.
According to an embodiment, Z is —N=C=X, with X being O.

According to an embodiment, x is an integer from 1 to 6.

Among the polyisocyanate or isothiocyanate monomers there may be cited tolylene diisocyanate or diisothiocyanate, phenylene diisocyanate or diisothiocyanate, ethylphenylene diisoocyanate, isopropyl phenylene diisocyanate or diisothiocyanate, dimethylphenylene diisocyanate or diisothiocyanate, diethylphenylene diisocyanate or diisothiocyanate, diisopropylphenylene diisocyanate or diisothiocyanate, trimethylbenzyl triisocyanate or triisothiocyanate, xylylene diisocyanate or diisothiocyanate, benzyl triiso(thio)cyanate, 4,4'-diphenyl methane diisocyanate or diisothiocyanate, naphtalene diisocyanate or diisothiocyanate, isophorone diisocyanate or diisothiocyanate, bis(isocyanate or diisothiocyanate methyl) cyclohexane, hexamethylene diisocyanate or diisothiocyanate and dicyclohexylmethane diisocyanate or diisothiocyanate.

According to an embodiment, the polyisocyanate monomer is xylylene diisocyanate and the polythiol monomer is 3-(2-sulanylethylthio)-2-(2-sulfanylethylthio) propane-1-thiol.

There can be used a single polyisocyanate or isothiocyanate monomer or a mixture thereof.

The polythiol monomer may be any suitable polythiol having two or more thiol functions. It may have two or three thiol functions.

The polythiol monomers can be represented by formula R'(SH)n' in which n' is an integer from 2 to 6, and R' is an organic group of valency equal to n'. n' may be an integer from 3 to 4.

Useful polythiol monomers are those disclosed in EP-A-394.495 and U.S. Pat. No. 4,775,733 and the polythiols corresponding to the following formulas:

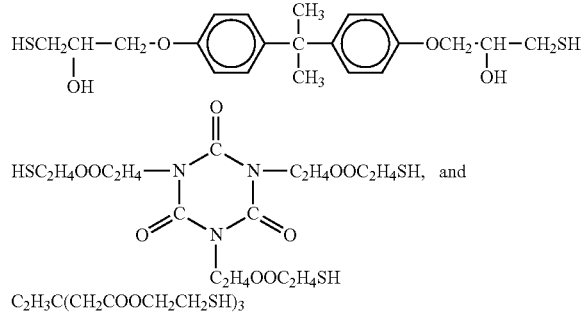

$C_2H_3C(CH_2COOCH_2CH_2SH)_3$

Among the polythiol monomers there may be cited aliphatic polythiols such as pentaerythritol tetrakis mercapto-proprionate, 1-(1'mercaptoethylthio)-2,3dimercaptopropane, 1-(2'-mercaptopropylthio)-2,3-dimercaptopropane, 1-(-3'mercaptopropylthio)-2,3 dimercaptopropane, 1-(-4'mercaptobutylthio)-2,3 dimercaptopropane, 1-(5'mercaptopentylthio)-2,3 dimercapto-propane, 1-(6'-mercaptohexylthio)-2,3-dimercaptopropane, 1,2-bis(-4'-mercaptobutylthio)-3-mercaptopropane, 1,2-bis(-5'mercaptopentylthio)-3-mercaptopropane, 1,2-bis(-6'-mercaptohexyl)-3-mercaptopropane, 1,2,3-tris(mercaptomethylthio)propane, 1,2,3-tris(-3'-mercaptopropylthio)propane, 1,2,3-tris(-2'-mercaptoethylthio)propane, 1,2,3-tris(-4'-mercaptobutylthio) propane, 1,2,3-tris(-6'-mercaptohexylthio)propane, methanedithiol), 1,2-ethanedithiol, 1,1-propanedithiol, 1,2-propanedithiol, 1,3-propanedithiol, 2,2-propanedithiol, 1,6-hexanethiol-1,2,3-propanetrithiol, and 1,2-bis(-2'-mercaptoethylthio)-3-mercaptopropane.

According to an embodiment, the polythiol is 3-(2-sulfanylethylthio)-2-(2-sulfanylethylthio)propane-1-thiol.

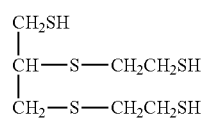

The polythiols have a viscosity at 25° C. of 2.10-1 Pa·s or less, or 10-1 Pa·s or less or 0.5.10-1 Pa·s or less.

Mixture (a)(ii)

According to an embodiment, the fast room-temperature polymerizable composition is chosen from a mixture of at least one liquid NCO- or NCS-terminated poly(thio)urethane prepolymer and at least one liquid SH-terminated poly(thio)urethane prepolymer.

Said mixture (ii) comprises:
a first component A comprising a polythiourethane prepolymer having isocyanate or isothiocyanate (NCX where X is O or S) end groups and a viscosity at 25° C. ranging from 0.02 to 0.4 Pa·s with
a second component B comprising a polythiourethane prepolymer having thiol (SH) end groups and a viscosity at 25° C. ranging from 0.2 to 2.0 Pa·s,
wherein components A and B are obtained by polymerizing at least one polyisocyanate or polyisothiocyanate monomer and at least one polythiol monomer.

The polyisocyanate or isothiocyanate useful for making the prepolymer components A and B can be any polyisocyanate or isothiocyanate monomers having two or more isocyanate or isothiocyanate functions per molecule, preferably two or three isocyanate or isothiocyanate functions and more preferably two isocyanate or isothiocyanate functions.

Components A and B are obtained by polymerizing at least one polyisocyanate or polyisothiocyanate monomer and at least one polythiol monomer as those monomers having the formulae as described in detail above in reference to mixture (a)(i).

Polymerization methods are classical, however the amounts of polyisocyanate or isothiocyanate monomers and polythiol monomers in the reaction medium shall be adapted in each case. Typically, components A and B can be prepared through classical thermal polymerization including induction and infra-red heating.

Component A

Component A comprises a polythiourethane prepolymer having isocyanate or isothiocyanate (NCX where X is O or S) end groups and a viscosity at 25° C. ranging from 0.02 to 0.4 Pa·s.

It is obtained by polymerizing at least one polyisocyanate or polyisothiocyanate monomer and at least one polythiol monomer as the ones described in detail above in reference to mixture (a)(i).

The amounts of polyisocyanate or polyisothiocyanate monomers and polythiol monomers are adapted so that the ratio NCX/SH for the mixture of polyisocyanate or isothiocyanate monomers and polythiol monomers is ranging from 4:1 to 30:1 for the obtention of component A.

Thus, component A may have a molar ratio of the isocyanate or isothiocyanate groups to the thiol groups NCX/SH ranging from 4:1 to 30:1.

According to an embodiment, the NCX/SH ratio is ranging from 6:1 to 10:1.

Component B

Component B comprises a polythiourethane prepolymer having thiol (SH) end groups and a viscosity at 25° C. ranging from 0.2 to 2.0 Pa·s.

It is obtained by polymerizing at least one polyisocyanate or polyisothiocyanate monomer and at least one polythiol monomer as the ones described in detail above in reference to mixture (a)(i).

The amounts of polyisocyanate or polyisothiocyanate monomers and polythiol monomers are adapted so that the ratio SH/NCX for the mixture of polyisocyanate or isothiocyanate monomers and the polythiol monomers is ranging from 4:1 to 30:1 for the obtention of component B.

Thus, component component B may have a molar ratio of the thiol groups to the isocyanate or isothiocyanate groups SH/NCX ranging from 4:1 to 30:1.

According to an embodiment, the SH/NCX ratio is ranging from 6:1 to 10:1.

Preparation of prepolymer having thiol end groups have already been described in U.S. Pat. No. 6,887,401. Similar process can be used to prepare components B of the present disclosure.

Component A of the present disclosure can be prepared in a similar manner but with the required ratio of polyisocyanate or isothiocyanate and polythiol monomers in order to obtain polythiourethane prepolymer having isocyanate or isothiocyanate end groups. A detailed example thereof is given below.

In a particular embodiment, the fast room-temperature polymerizable composition of the present disclosure is in the form of a two-component polymerizable composition, i.e. a composition which is formulated as two separate components which are mixed together just before use.

In this two-component embodiment, the composition comprises a first separate component or premix which contains the totality of the polyiso(thio)cyanate monomer, possibly, part or the totality of the polythiol monomer, and optionally the UV absorber and the mold release agent, and a second separate component or premix which comprises part or the totality of the polythiol monomer, and optionally the solvent.

In this two-component embodiment of the composition of the present disclosure, the first premix comprises:
  40-100 parts by weight of the polyiso(thio)cyanate monomer,
  0-60 parts by weight of the polythiol monomer;
  0-0.3 parts by weight of a UV absorber; and
  0-0.2 parts by weight of an internal mold release agent;
and the second premix comprises:
  0-100 parts by weight of the polythiol monomer;
  0-1 part by weight of solvent.

The following examples illustrate the preparation of prepolymer components A and B.

The mixing of component A with component B can be performed by any known mixing technique such as those mentioned in U.S. Pat. No. 6,887,401 wherein components A and B are mixed in the absence of any catalyst.

The mixing, which can be a mechanical or ultrasonic mixing, is generally effected at room temperature for a duration ranging from 10 to 180 seconds. Components A and B to be mixed may be added in a small reactor chamber and then mixed with a screw mixer.

Preparation of Polythiourethane Prepolymer Having Isocyanate end Groups (Component A)

In a reactor equipped with a condenser, a thermal probe and an agitator there is charged a determined amount of xylylene diisocyanate (XDI). The polyisocyanate monomer is then heated up to 115° C. Then, 3-(2-sulfanylethylthio)-2-(2-sulfanylethylthio)propane-1-thiol. is introduced and mixed with the polyisocyanate in an amount such that the molar ratio of the isocyanate functions to the thiol functions $$\frac{NCO}{SH}$$

is 6:1.

After heating between 3 to 4.5 hours the reaction is complete.

Prepolymer is then cooled and when prepolymer temperature reaches 35° C. (+/−5° C.), the prepolymer is transferred into an appropriate drum, tapped with inert gas (nitrogen or argon) and stored in a cold room.

Final prepolymer with isocyanate end groups (component A) has a viscosity at 25° C. of 0.219 Pa·s.

Preparation of Polythiourethane Prepolymer Having Thiol End Groups (Component B)

In a reactor equipped with a condenser, a thermal probe and an agitator there is charged a determined amount of 3-(2-sulfanylethylthio)-2-(2-sulfanylethylthio) propane-1-thiol.

The polythiol monomer is then heated to 90° C. Then, xylylene diisocyanate (XDI) is introduced and mixed with the polythiol in an amount such that the molar ratio of the thiol groups to the isocyanate groups $$\frac{SH}{NCO}$$

is 8:1.

The reaction is completed within 3 hours. The end of reaction is indicated by temperature reaching a peak and returning to 90° C. (+/−2° C.).

Prepolymer is then cooled and when prepolymer temperature reaches 35° C. (+/−5° C.), the prepolymer is transferred to an appropriate drum, topped with inert gas (nitrogen or argon) and stored in a cold room.

Final prepolymer with thiol end groups (component B) has a viscosity at 25° C. of 0.543 Pa·s.

Mixture (a)(iii)

According to an embodiment, the fast room-temperature polymerizable composition is chosen from a mixture of at least one poly(iso)thiocyanate monomer and at least one liquid SH-terminated poly (thio) urethane prepolymer.

The at least one polyisocyanate or polyisothiocyanate monomer is that described above in reference to mixture (a)(i). The at least one liquid SH-terminated poly (thio) urethane prepolymer is that described above in reference to mixture (a)(ii) as component B.

Mixture (a)(iv)

According to an embodiment, the fast room-temperature polymerizable composition is chosen from a mixture of at least one polythiol and at least one liquid NCO- or NCS-terminated poly (thio) urethane prepolymer.

The at least one polythiol is that described above in reference to mixture (a)(i). The at least one liquid NCO- or NCS-terminated poly (thio) urethane prepolymer is that described above in reference to mixture (a)(ii) as component A.

Mixture (b)

According to an embodiment, the fast room-temperature polymerizable composition is chosen from one or more polymerizable episulfide compounds.

The episulfide compounds for use in these compositions of the disclosure are those described in the above cited European patent applications EP-A-761 665 and 785 194. These episulfide compounds have two or more moieties of formula:

$$—SCH_2CH\underset{X}{\overset{}{\diagdown\diagup}}CH_2, \text{ where X os S or O,}$$

at least one of these moieties being an episulfide group.

The fast room-temperature polymerizable composition of the disclosure may include up to 100% by weight of one or more of the episulfide compounds or the polymerizable compositions may comprise one or more episulfide compounds and one or more copolymerizable monomers.

Among the copolymerizable monomers that may be used are the polythiol monomers described above.

The Catalyst Composition Useful for the Present Disclosure

Among the catalyst composition that can be used in the method described herein, there may be cited tertiary amines, such as triethylamine, organometallic compounds, such as dibutyltin dilaurate, and alkaline metals, alkaline earth metals, transition metals and ammonium salts of acids or mixtures thereof, these salts fulfilling the condition $0.5 \leq pKa \leq 14$.

These latter salts are defined as salts of formula: $M_m^{P+} Y_n^-$, wherein:
  $M_m^{P+}$ is a cation selected from the group consisting of alkaline metals, alkaline earth metals, transitions metals and ammonium groups of formula $NR^+_4$ in which R is an alkyl radical,
  Y– is an anion such as the corresponding acid YH has a pKa fulfilling the condition $0.5 \leq pKa \leq 14$,
  p is the valency of the cation, and
  $n = m \times p$.

The catalyst composition may consist solely in the salt or a mixture of these salts.

Metallic cations of the salts are $Li^+$, $Na^+$, $K^+$, $Rb^+$, $Mg^{2+}$, $Ca^{2+}$, $Ba^{2+}$ and $Al^{3+}$. The particularly preferred metallic cations are $Li^+$, $Na^+$ and $K^+$ due to their absence of color and solubility in the composition.

Transition metals are less preferred because the salts thereof lead to colored compositions and therefore colored polymerized resins.

The $NR^+_4$ groups may be those in which R is a C1-C8 alkyl radical and more preferably, a methyl, ethyl, propyl, butyl or hexyl radical.

The salts shall be used in the fast room-temperature polymerizable composition in an effective amount, i.e. an amount sufficient to promote the room temperature polymerization of the composition.

Generally, the salt will be present in amounts ranging, based on the total weight of the polymerizable monomers, from 5 to 2000 parts per million (ppm), or from 10 to 500 ppm or from 40 to 100 ppm.

Y– may be an anion such as the corresponding acid YH which fulfills the condition $0.5 \leq pKa \leq 10$ and more preferably $0.5 \leq pKa \leq 8$.

The anion Y– may be selected from the group consisting of thiocyanate, carboxylate, thiocarboxylate, acetylacetonate, diketone, acetoacetic ester, malonic ester, cyanoacetic ester, ketonitrile and anion of formula $RS^-$ wherein R is a substituted or non-substituted alkyl group or phenyl group.

The alkyl group may be a $C_1$-$C_6$ alkyl group, such as methyl, ethyl and propyl.

The anions Y– are thiocyanate ($SCN^-$), acetylacetonate, acetate, thioacetate, formate and benzoate.

According to an embodiment, the salt is KSCN.

Generally, the salt will be present in amounts ranging, based on the total weight of the polymerizable monomers, from 0.001 to 2.5%, preferably 0.001 to 1%. Electron-donor compounds may be used in combination with the salt and are selected from the group consisting of acetonitrile compounds, amide compounds, sulfones, sulfoxides, trialkylphosphites, nitro compounds, ethyleneglycol ethers, crown ethers and kryptates.

Examples of acetonitrile compounds are:

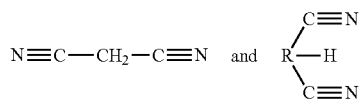

in which
R is an alkyl group. It may be a $C_1$-$C_6$ alkyl group such as methyl, ethyl, propyl, butyl.

The amide compounds may be primary, secondary or tertiary amide compounds.

The trialkylphosphites and triarylphosphites may be represented by formula:

in which
R, R', R''' are either an alkyl group, preferably a C1-C6 alkyl group or an aryl group such as a phenyl group. Preferred are trialkylphosphites, for example (C2H5O) 3P.

Electron-donor compounds may also be selected from crown ethers and kryptates.

These cyclic molecules are usually chosen to exhibit a good compromise between the heteroatom or metal size and the "cage" size, i.e. between the number of heteroatoms and the size and the "cage" size, i.e. between the number of heteroatoms and the size of the cycle.

The preferred crown ethers and kryptates may be represented by the following formulae:

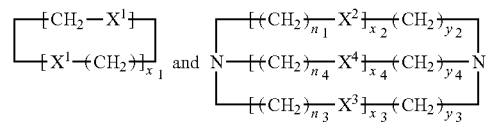

wherein
$X^1$ represents O, S or NH, $x_1$ is an integer from 3 to 6, preferably from 3 to 4,
$X^2$, $X^3$ and $X^4$ represent O, S, $n_2$, $n_3$, $n_4$, y2, $y_3$, $y_4$ are 2 or 3 and $x_2$, $x_3$, $X_4$, are 2 or 3.

Among the preferred crown ethers and kryptates there may be cited the following compounds:

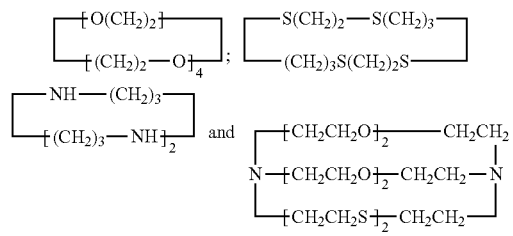

The electron-donor compounds are present, based on the total weight of the polymerizable monomers in amounts ranging from 0 to 5% by weight, preferably 0 to 1% by weight, and most preferably crown ethers such as 18-crown-6, 18-crown-7, 15-crown-5 and 15-crown-6.

For the composition containing the episulfide compound, the reactivity increases with the cation size of the thiocyanate salt (potassium salts are more reactive than sodium salts which are more reactive than lithium salts).

Also, for the compositions containing episulfide compounds, the presence of a crown ether is highly recommended to promote the polymerization reaction. An increase of the crown ether size seems to reduce the reactivity.

According to a particular embodiment, the catalyst composition is mixed with part of one monomer of those used in mixture (a)(i) or (iii) or (iv): either the poly (iso) thiocyanate monomer or the polythiol monomer. The obtained composition is then deposited on the inside surfaces of at least one of the molds and/or on at least one of the surfaces of the light filtering element which is thereafter positioned in the mold assembly. The process continues by closing the casting mold assembly so that the inside surfaces of the molds form together the molding cavity and filling the remaining fast room-temperature polymerizable composition in the molding cavity of the casting mold assembly already containing the catalyst composition deposited and said part of one monomer on the inside surface of at least one of the molds. As used in the context of this embodiment, the remaining fast room-temperature polymerizable composition comprises the remaining part of the monomer previously mixed with the catalyst and the other at least one monomer as described in mixtures (a)(i) or the prepolymers as described in mixtures (a)(iii) or (iv). An example thereof is given: the catalyst composition is further mixed with part of the chosen polythiol and deposited on the inside surface of the mold, as described above. Since the other monomer is not added, the polymerization reaction cannot be triggered. The remaining part of the polythiol is then filled together with the other monomer, i.e. the poly (iso) thiocyanate monomer, thus triggering the polymerization reaction.

According to a particular embodiment, the catalyst composition is mixed with part of one prepolymer of those used in mixture (a)(ii): either the liquid NCO- or NCS-terminated poly (thio) urethane prepolymer or the liquid SH-terminated poly (thio) urethane prepolymer. The obtained composition is then deposited on the inside surfaces of at least one of the molds and/or on at least one of the surfaces of the light filtering element which is thereafter positioned in the mold assembly. The process continues by closing the casting mold assembly so that the inside surfaces of the molds form together the molding cavity and filling the remaining fast room-temperature polymerizable composition in the molding cavity of the casting mold assembly already containing the catalyst composition deposited and said part of one prepolymer on the inside surface of at least one of the molds. As used in the context of this embodiment, the remaining fast room-temperature polymerizable composition comprises the remaining part of the prepolymer previously mixed with the catalyst and the other at least one prepolymer as described in mixtures (a)(ii). An example thereof is given: the catalyst composition is further mixed with part of prepolymer defined as being component B hereinabove and deposited on the inside surface of the mold, as described above. Since the other prepolymer defined as being component A hereinabove is not added, the polymerization reaction cannot be triggered. The remaining part of the prepolymer B is then filled together with the other prepolymer A, thus triggering the polymerization reaction.

Further Components

The catalyst composition used may comprise a solvent for promoting the dissolution of the salt catalyst.

Any polar organic can be used such as acetonitrile, tetrahydrofurane or dioxane. Other suitable solvents are methanol, ethanol, thioethanol, acetone, acetonitrile and 3-methyl-2-butene-1-ol.

The amount of solvent is generally kept below 2% by weight, based on the total weight of the polymerizable monomers present and preferably between 0 and 0.5% by weight, or between 0.0001% and 0.5% to avoid haze and bubbling.

The fast room-temperature polymerizable composition of the present disclosure may also include additives which are conventionally employed in polymerizable compositions intended for moulding optical articles, in particular ophthalmic lenses, in conventional proportions, namely inhibitors, dyes, photochromic agents, UV absorbers, perfumes, deodorants, antioxidants, antiyellowing agents and release agents.

The perfumes allow the odour of the compositions to be masked, in particular during surfacing or routering operations.

In particular, usual UV absorbers such as those commercialized under the tradenames UV 5411 (R), UV 9(R), Tinuvin400(R), Tinuvin P(R), Tinuvin 312(R), Seesorb 701 (R) and Seesorb 707(R) may be used in amounts generally up to 2% by weight of the total polymerizable monomers weight.

Also, the compositions of the disclosure may comprise a release agent in an amount up to 0.1% by weight of the total polymerizable monomers/prepolymers weight.

Among the release agents there may be cited mono and dialkyl phosphates, silicones, fluorinated hydrocarbon, fatty acids and ammonium salts. The preferred release agents are mono and dialkyl phosphates and mixtures thereof. Such release agents are described interalia in document U.S. Pat. Nos. 4,662,376, 4,975,328 and EP-271.839.

Light Filtering Element

According to an embodiment, the light filtering element is chosen from a polarizing film, a polarizing laminate, a photochromic film, a photochromic laminate, a near infrared filter, a near infrared laminate, a blue cut filter, a blue cut filter laminate, a microstructured film and a microstructured laminate.

As used herein, a "light filtering element" is an optical filter that limits or modifies the total amount of light that passes through the element.

This filter refers to a film structure formed of either a single film layer or a film laminate structure formed of multiple film layers attached to one another. More precisely, the filter can be formed of an ophthalmic grade functional film (with for example polar or photochromic properties) and having an ophthalmic-grade protective film on one or both sides of the ophthalmic-grade functional film. This kind of multi-layer filter can also be called a laminate, a wafer or a laminated wafer.

In a casting process, such filter is placed into the front side of a molding cavity, and the fast room-temperature polymerizable composition is injected against the filter. According to an embodiment, the catalyst composition is deposited on at least one surface of the filter.

According to an embodiment, the light filtering element is a polarizing film or polarizing laminate selected from the group consisting of a polarizing film of polyvinyl alcohol film (PVA), a polarizing laminate consisting of a polarizing layer supported on both sides with triacetate cellulose layers (a triacetate cellulose (TAC)/polyvinyl alcohol (PVA)/triacetate cellulose (TAC) laminate), a polarizing laminate consisting of a polarizing layer supported on both sides with polycarbonate layers (a polycarbonate (PC)/polyvinyl alcohol (PVA)/polycarbonate (PC) laminate).

As used herein, PVOH and PVA can be used interchangeably.

Photochromic films or laminates are well known and contain photochromic dyes selected from the group consisting of pyrans, oxazines, fulgides and fulgimides.

Polarizing Films or Laminates

Polarizing films or wafers are well known in the art and can be any polarizing film or wafer typically used for making polarized optical articles such as ophthalmic lenses.

Such filters are known and described in numerous patents such as US20070202265, US20180052267 and US20210268755.

Polarizing films or wafers may comprise a variety of different constructions and materials. Such constructions include freestanding or non-laminated films, films with removable protective sheeting, films with outer permanent protective coatings or supportive plastic layers and laminated films and wafers.

Among the polarizing films there may be cited poly (ethylene terephtalate) (PET) films and poly(vinyl alcohol) (PVOH) films.

Other polarizing films may include thin, multilayered polymeric materials, combined reflective and dichroïc polarizers, or films of mixed polymeric phases such as those described in U.S. Pat. Nos. 5,882,774; 6,096,375; and 5,867,316.

Among the polarizing wafers there may be cited polycarbonate/PVOH/polycarbonate layered combinations less than 1 mm thick.

Preferably, one uses the polarizing wafers having a thickness higher than 0.10 mm and better from 0.20 to 0.80 mm, preferably from 0.30 to 0.80 mm, more preferably from 0.40 to 0.80 mm.

Typically, the PVOH core film has a thickness from 0.01 to 0.04, preferably from of 0.02 to 0.04 mm and the two shell layers have a thickness of around 0.30 mm.

Materials other than polycarbonate for the wafer construct may also comprise poly(methyl methacrylate), polystyrene, cellulose acetate butyrate (CAB), cellulose acetate, and cellulose triacetate.

According to an embodiment, the polarizing wafer is a CAB/PVOH/CAB multilayered combination.

According to an embodiment, the polarizing wafer is a TAC/PVOH/TAC multilayered combination.

To improve adhesion of the polarizing wafer to the cured fast room-temperature polymerizable composition constituting the substrate, unless otherwise stated, the wafer may be chemically treated by immersing the wafer into a 5% NaOH or a 1N HCl aqueous solution. Immersion time and temperature may vary widely depending upon the nature of the wafer and the polymerizable composition. Typically, immersion is effected at a temperature ranging from 20° C. to 50° C., preferably about 40° C. and lasts up to 1 hour, preferably about 30 minutes.

The polarizing wafer is then rinsed with de-ionized water for about 15 seconds, thereafter placed in warmed de-ionized water for 1 minute and finally rinsed again with de-ionized water for 15 seconds.

Then, the polarizing wafer can be dried. Drying temperature and time may vary widely. The hydrolyzed CAB layers have increased in their hydrophilic nature, having values of contact angle of about 30-35°.

Microstructured Film

Alternatively, or in another embodiment of the present disclosure, microstructured films or microstructured laminates may be added. Such films or laminates are known and described in numerous patents such as EP3895880. For applications in the lens field, they are added for the purpose of myopia control, increasing optical power and/or providing anti-reflective properties.

As used herein, a microstructured film is a film having a microstructure on the surface thereof.

As used herein, a microstructured laminate is a film having a microstructure on a surface thereof and a coating layer formed on the film and encapsulating the microstructure of the film.

According to an embodiment, the microstructure film may be a structure that is suitably embedded into the fast room-temperature polymerizable composition constituting the substrate. According to another complementary or alternative embodiment, the microstructure laminate may be a structure that is suitably applied onto the outside surface of the obtained substrate. Examples of the microstructure include, but are not limited to, a structure for controlling myopia; a structure for increasing optical power of the substrate, such as Fresnel microstructure; and a structure for providing anti-reflection properties to the substrate, such as moth eye structure.

According to an embodiment, the microstructured film may have a thickness from 50 μm to 2 mm.

According to an embodiment, the microstructured film may include, or may be made of, a polymer, for example a thermoplastic polymer. Examples of the thermoplastic polymers included in or constituting the microstructured film include, but are not limited to, polycarbonate, thermoplastic urethane, polyacrylate, polyester, copolyester, polymethacrylate, polystyrene, polyamide, polysulfone, polyphenylsulfone, polyetherimide, polypentene, polyolefin, ionomer, ethylene methacrylic acid, cyclic olefin copolymer, acrylonitrile, and styrene maleic anhydride.

A copolymer of these polymers may also be used. The copolymer may have two or more structures derived from different polymers in one molecule. The copolymer may include at least one structure derived from a polymer other than those described above.

A derivative of the polymers described above may also be used. The derivative may have at least one functional group bonded to the molecule of the polymers described above.

A mixture of these polymers, copolymers, and/or derivative may also be used. The mixture may be a resin including two or more molecules of different polymers. The mixture may include at least one polymer other than those described above.

The film may contain various additives, dyes, and/or light filters. Examples of additives may include, but are not limited to, heat stabilizers, mold release, HALS (hindered amine light stabilizers), and light stabilizers. The dyes may be, for example, color balancing dyes, photochromic dyes, dichroic dyes. The light filters may be, for example, blue light cut dyes, UV cut dyes, IR cut dyes, or any other functional constituent. Those additives, dyes, and light filters may be used alone or in any combinations.

According to an embodiment, the film is transparent. The microstructure may be formed on one or both surfaces of the film. In one embodiment, the microstructure may be formed on one surface of the film. The microstructure may be formed by any process or method. For example, the microstructure may be formed on a surface of the film by embossing the surface of the film by the emboss rolls.

Microstructured Laminates

According to an embodiment, the microstructured laminates comprise a film as described hereinabove and a coating layer formed on the film and encapsulating the microstructure of the film. In one embodiment, the coating layer is completely filled between the gaps of the microstructure.

The coating layer may include, or may be made of, a polymer, for example a thermoplastic polymer. The thermoplastic polymers described above, as well as the copolymers and derivatives of these polymers described above, and mixtures thereof may be used. The coating layer may also include additives, dyes, and/or light filters described above.

According to an embodiment, the coating layer is transparent.

According to an embodiment, the glass transition temperature (T1) of the film is higher than the glass transition temperature (T2) of the coating layer. Thus, the material(s) of the coating layer may be determined based on the material of the film, and vice versa. Each of T1 and T2 may be from 80 to 200° C., preferably from 85 to 190° C., including all ranges and subranges therebetween. The difference between T1 and T2 may be from 10 to 100° C., preferably from 12 to 75° C., including all ranges and subranges therebetween.

For example, when the film is made of or includes polycarbonate, the coating layer may be made of or includes polymethyl methacrylate. When the film is made of or includes polysulfone, the coating layer may be made of or include polyester. When the film is made of or includes copolyester, the coating layer may be made of or include polymethyl methacrylate. When the film is made of or includes polyamide, the coating layer may be made of or include polymethyl methacrylate. When the film is made of or includes copolyester, the coating layer may be made of or include thermoplastic urethane. Also, the film and the coating layer may be made of the same polymer as long as the glass transition temperature (T1) of the film is higher than the glass transition temperature (T2) of the coating layer. For example, when the film is made of or includes polyamide, the coating layer may be made of or include polyamide having a glass transition temperature lower than the glass transition temperature of the polyamide in the film. These combinations are provided for exemplary purposes only, and the combination of the materials of the film and the coating layer is not particularly limited, as long as the glass transition temperature (T1) of the film is higher than a glass transition temperature (T2) of the coating layer.

According to an embodiment, the refractive index of the coating layer (n2) is different from the refractive index of the film (n1). Each of n1 and n2 may be from 1.45 to 1.65, preferably from 1.49 to 1.64, including all ranges and subranges therebetween.

The thickness (h2) of the coating layer may be determined based on the size of the microstructure on the surface of the film, and/or based on the thickness (h1) of the film and the modulus of the film and the coating layer.

The minimum thickness ($h_{2,\,min}$) of the coating layer may be equal to the height of the microstructure on the surface of the film, or calculated using the following equation (1), whichever is larger: $h_{2\,(min)} = h_1 \times (E_1/E_2)$
where E1 is the modulus of the film and E2 is the modulus of the coating layer.

The coating layer may be sufficiently thick so that the microstructure on the surface of the film is substantially, or completely, embedded in the coating layer.

The maximum thickness (h2, max) of the coating layer is not particularly limited and may be determined based on the application of the laminate.

The material of the coating layer may have good compatibility with the material of the film so that the coating layer is strongly bonded to the film. In one aspect, the coating layer may be bonded to the film so that the peel strength (measured under the test method ASTM D1876-01) between the film and the coating layer is at least 100 g/25 mm.

According to an embodiment, both the microstructured films and the microstructured laminates described above may be deformed into a shape of choice by applying heat, pressure, or both.

The deformation may be performed by, for example, a thermoforming process using a thermoformer, or an injection molding process with an insert. During the deformation, the laminate may be inserted in a mold in such a manner that the pressure is directly applied on the coating layer of the laminate. A polymer lens may also be inserted in the mold along with the laminate so that the laminate is injection-molded with the polymer lens. The polymer lens may be made of or include the material of the film. The laminate may also be inserted in the mold against an insert, and a hot polymer melt may be injection molded onto the laminate. The same applies for a microstructured film.

The deformation may be performed at a temperature lower than the glass transition temperature (T1) of the film. In one embodiment, the deformation may be performed at a temperature around the glass transition temperature (T2) of the coating layer and lower than the glass transition temperature (T1) of the film. By performing the deformation at such a temperature, the laminate may be deformed, while the microstructure formed on the surface of the film may not be deformed. The same applies for a microstructured film.

According to an aspect, the disclosure relates to an optical article manufactured by the method of the first aspect.

According to an aspect, the disclosure relates an ophthalmic lens manufactured by the method of the first aspect.

The transparent ophthalmic lens, manufactured in accordance with an embodiment of the present disclosure, represents an ophthalmic lens selected from blank lens, semi-finished lens, finished lens, and lens adapted to see-through "Head-Mounting Display" (HMD). By "Head mounting display" it is understood a device able to be mounted on the head of a wearer, and comprising an optical imager for shaping light beams coming from an electronic and optical system that generates light beams from an electronic signal, the system being of the miniature screen, laser diode, or light-emitting diode (LED) type; the optical imager directing light beams towards the eye of the wearer so as to enable an information content to be used.

Said transparent ophthalmic lens, may also represent a lens selected from afocal (or no-corrective, or plano), unifocal, bifocal, trifocal, and progressive lens, said ophthalmic lens being able to be mounted either to traditional frame comprising two distinctive ophthalmic lenses, one for the right eye and one for the left eye, or to mask, visor, helmet sight or goggle, wherein one ophthalmic lens facing simultaneously the right and the left eyes, and said ophthalmic lens may be produced with traditional geometry as a circle or may be produced to be fitted to the geometry to the frame intended. When said ophthalmic lens is dedicated to be mounted to a see-through "HMD", said lens may be corrective or afocal, and may be placed on the front face and/or on the rear face of the optical imager of the HMD. When the ophthalmic lens is placed on the front face and on the rear face of the optical imager, it means that the optical imager is inserted inside said ophthalmic lens.

"Ophthalmic lens", according to the disclosure, is defined as lens adapted namely for mounting in eyeglasses whose function is to protect the eye and/or to correct vision; this lens is selected from the afocal, unifocal, bifocal, trifocal, and progressive lens. Then it is understood that ophthalmic lens may be corrective or un-corrective. Eyeglasses wherein ophthalmic lens will be mounted could be either traditional frame comprising two distinctive ophthalmic lenses, one for the right eye and one for the left eye, or like mask, visor, helmet sight or goggle, wherein one ophthalmic lens facing simultaneously the right and the left eyes. Ophthalmic lens manufactured by a method of the disclosure may be produced with traditional geometry as a circle or may be produced to be fitted to the frame intended.

Ophthalmic lens manufactured in accordance with a method of the disclosure can furthermore be functionalized, in a further step after optionally post-treatment step, by adding at least a functional coating and/or a functional film. Functionalities may be added on one face or surface of the ophthalmic lens, or on the two faces of ophthalmic lens, and on each face, functionalities may be identical or different. Among the functionality, it may be mentioned, as example and without any limitation a functionality selected from anti-impact, anti-abrasion, anti-soiling, anti-static, anti-reflective, anti-fog, anti-rain, self-healing, polarization, tint, photochromic, selective wavelength filter which could be obtain through an absorption filter or reflective filter. Such selective wavelength filters are particularly interested to filter ultraviolet radiation, blue light radiation, or infra-red radiation for example.

The functionality may be added by at least one process selected from dip-coating, spin-coating, spray-coating, vacuum deposition, transfer process or lamination process. By transfer process it is understood that functionality is firstly deposited on a support like a carrier, and then is transferred from said carrier to said ophthalmic lens through an adhesive layer deposited between the two elements. Lamination is defined as obtaining a permanent contact between a film which comprises at least one functionality as mentioned hereinbefore and the surface of the ophthalmic lens to be treated, said permanent contact being obtained by the establishment of a contact between said film and said lens, followed optionally by a polymerization step or a heating step, in order to finalize the adhesion and adherence between the two entities. At the end of this lamination process the assembled film and the optical lens form one single entity. Usually to lamination process, glue is present in the interface of the film and the ophthalmic lens. An example thereof is detailed above in reference to the microstructured laminates added to one or both faces or surfaces of the ophthalmic lens.

EXAMPLES

Example 1

A catalyst solution comprising 0.191 g of 18-crown-6, 0.048 g of KSCN and 0.318 g of thioethanol is spin-coated on the cc surface of the cx mold. Then 10.00 g of NCO terminated prepolymer xylylene diisocyanate made with an 8/1 ratio of NCO/SH (viscosity equals 0.071 Pa·s at 25 C) is mixed with 9.39 g of SH terminated prepolymer 3-(2-sulfanylethylthio)-2-(2-sulfanylethylthio)propane-1-thiol made with a 8/1 ratio of SH/NCO (viscosity equals 0.543 Pa·s at 25 C), and the mixture filled in to the mold assembly.

Gelation occurs in less than 10 minutes at room temperature, and the reaction is completed in an air oven at 135° C. for 2 hrs.

Example 2

A catalyst solution comprising 0.191 g of 18-crown-6, 0.048 g of KSCN and 0.318 g of thioethanol is spin-coated on the cx surface of the cc mold. Then 10.00 g of NCO terminated prepolymer xylylene diisocyanate made with an 8/1 ratio of NCO/SH (viscosity equals 0.071 Pa·s at 25 C) is mixed with 9.39 g of SH terminated prepolymer 3-(2-sulfanylethylthio)-2-(2-sulfanylethylthio) propane-1-thiol made with a 8/1 ratio of SH/NCO (viscosity equals 0.543 Pa·s at 25 C), and the mixture filled in to the mold assembly. Gelation occurs in less than 10 minutes at room temperature, and the reaction is completed in an air oven at 135° C. for 2 hrs.

Example 3

A catalyst solution comprising 0.191 g of 18-crown-6, 0.048 g of KSCN and 0.318 g of thioethanol is made. 50% of this solution is spin-coated on the cc surface of the cx mold, and 50% of this solution is spin-coated on the cx surface of the cc mold. Then 10.00 g of NCO terminated prepolymer xylylene diisocyanate made with an 8/1 ratio of NCO/SH (viscosity equals 0.071 Pa·s at 25 C) is mixed with 9.39 g of SH terminated prepolymer 3-(2-sulfanylethylthio)-2-(2-sulfanylethylthio) propane-1-thiol made with a 8/1 ratio of SH/NCO (viscosity equals 0.543 Pa·s at 25 C), and the mixture filled in to the mold assembly. Gelation occurs in less than 10 minutes at room temperature, and the reaction is completed in an air oven at 135° C. for 2 hrs.

Example 4

A catalyst solution comprising 0.191 g of 18-crown-6, 0.048 g of KSCN and 0.318 g of thioethanol is made. 50% of this solution is spin-coated on the cc surface of a polar film, and 50% of this solution is spin-coated on the cx surface of the polar film. The polar film is then positioned in the mold assembly.

10.00 g of NCO terminated prepolymer xylylene diisocyanate made with an 8/1 ratio of NCO/SH (viscosity equals 0.071 Pas at 25 C) is mixed with 9.39 g of SH terminated prepolymer 3-(2-sulfanylethylthio)-2-(2-sulfanylethylthio) propane-1-thiol made with a 8/1 ratio of SH/NCO (viscosity equals 0.543 Pa·s at 25 C), and the mixture filled in to the mold assembly. Gelation occurs in less than 10 minutes at room temperature, and the reaction is completed in an air oven at 135° C. for 2 hrs.

Example 5

A catalyst solution comprising 0.191 g of 18-crown-6, 0.048 g of KSCN, 0.318 g of thioethanol, 0.760 N,N-dicyclohexylmethylamine is made. 50% of this solution is spin-coated on the cc surface of the cx mold, and 50% of this solution is spin-coated on the cx surface of the cc mold. Then 10.00 g of NCO terminated prepolymer xylylene diisocyanate made with an 8/1 ratio of NCO/SH (viscosity equals 0.071 Pa·s at 25 C) is mixed with 9.39 g of SH terminated prepolymer 3-(2-sulfanylethylthio)-2-(2-sulfanylethylthio) propane-1-thiol made with a 8/1 ratio of SH/NCO (viscosity equals 0.543 Pa·s at 25 C), and the mixture filled in to the mold assembly. Gelation occurs in less than 10 minutes at room temperature, and the reaction is completed in an air oven at 135° C. for 2 hrs.

Example 6

A catalyst solution comprising 0.012 g of 18-crown-6, 0.003 g of KSCN and 0.318 g of thioethanol is spin-coated on the cc surface of the cx mold. Then 10.00 g of xylylene diisocyanate monomer is mixed with 9.23 g of 1,2-bis(2'-mercapto ethyl thio)-3 mercaptopropane monomer, and the mixture filled into the mold assembly. Gelation occurs in less than 10 minutes at room temperature, and the reaction is completed in an air oven at 120° C. for 2 hrs.

Example 7

A catalyst solution comprising 0.012 g of 18-crown-6, 0.003 g of KSCN and 0.318 g of thioethanol is made. 50% of this solution is spin-coated on the cc surface of the cx mold, and 50% of this solution is spin-coated on the cx surface of the cc mold. Then 10.00 g of xylylene diisocyanate monomer is mixed with 9.23 g of 1,2-bis(2'-mercapto ethyl thio)-3 mercaptopropane monomer, and the mixture filled into the mold assembly. Gelation occurs in less than 10 minutes at room temperature, and the reaction is completed in an air oven at 120° C. for 2 hrs.

Example 8

A catalyst solution comprising 0.035 g of 15-crown-6, 0.002 g of LiSCN and 0.318 g of acetonitrile is spin-coated on the cc surface of the cx mold. Then 10.00 g of xylylene diisocyanate monomer is mixed with 12.99 g of Tetrakis mercaptopropionate pentaerythritol monomer, and the mixture filled into the mold assembly. Gelation occurs in less than 10 minutes at room temperature, and the reaction is completed in an air oven at 120° C. for 2 hrs.

Example 9

A catalyst solution comprising 0.008 g of 18-crown-6, 0.002 g of KSCN, 0.318 g of thioethanol, and 0.030 g of N,N-dicyclohexylmethylamine is spin-coated on the cc surface of the cx mold. Then 20.00 g of Bis(beta-epithiopropyl) sulfide monomer is filled into the mold assembly. Gelation occurs in less than 1 hour at 45C, and the reaction is completed in an air oven at 80° C. for 2 hrs.

Although representative processes and articles have been described in detail herein, those skilled in the art will recognize that various substitutions and modifications may be made without departing from the scope of what is described and defined by the appended claims.

What is claimed is:

1. A method of curing a transparent casted substrate, comprising:
   providing a room-temperature polymerizable composition;
   providing a catalyst composition;
   providing a casting mold assembly containing two unsealed molds each having an inside surface and an outside surface; and optionally providing a light filtering element placed or configured to be placed between the two molds;
   depositing the catalyst composition:
      on the inside surface of at least one of the molds; and/or
      on at least one surface of the light filtering element which is thereafter positioned in the mold assembly;
   closing the casting mold assembly so that the inside surfaces of the molds form together the molding cavity;
   filling the room-temperature polymerizable composition in the molding cavity of the casting mold assembly already containing the catalyst composition deposited on the inside surface of at least one of the molds;
   curing the filled mold assembly to obtain a transparent solid substrate, said curing step comprising:
      a) a first step for polymerizing said composition at room temperature to obtain a gel; and
      b) a second step of post-curing the gel to obtain the transparent solid substrate; and
   recovering the transparent solid substrate from the casting mold assembly,
   wherein upon contact with the polymerizable composition, the catalyst composition initiates polymerization of the polymerizable composition.

2. The method of claim 1, wherein depositing the catalyst composition on the inside surface of at least one of the molds and/or at least one surface of the light filtering element is performed by liquid phase deposition.

3. The method of claim 1, wherein depositing the catalyst composition on the inside surface of at least one of the molds and/or at least one surface of the light filtering element is performed by spin coating, dip coating, spray coating, brush coating, or roller coating.

4. The method of claim 1, wherein the room-temperature polymerizable composition has a viscosity at 25° C. ranging from 0.1 to 0.3 Pa·s.

5. The method of claim 1, wherein the room-temperature polymerizable composition is selected from the group consisting of:
   (a) mixture of at least one poly (iso) thiocyanate monomer or liquid NCO- or NCS-terminated poly (thio) urethane prepolymer and at least one polythiol monomer or liquid SH-terminated poly (thio) urethane prepolymer; and
   (b) one or more polymerizable episulfide compounds.

6. The method of claim 5, wherein said mixture (a) comprises:
   a first component A comprising a polythiourethane prepolymer having isocyanate or isothiocyanate (NCX where X is O or S) end groups and a viscosity at 25° C. ranging from 0.02 to 0.4 Pa·s with
   a second component B comprising a polythiourethane prepolymer having thiol (SH) end groups and a viscosity at 25° C. ranging from 0.2 to 2.0 Pa·s,
   wherein components A and B are obtained by polymerizing at least one polyisocyanate or polyisothiocyanate monomer and at least one polythiol monomer.

7. The method of claim 6,
wherein:
   amounts of polyisocyanate or polyisothiocyanate monomers and polythiol monomers are adapted so that the ratio NCX/SH for the mixture (a) of polyisocyanate or isothiocyanate monomers and polythiol monomers is ranging from 4:1 to 30:1 for the obtention of component A and the ratio SH/NCX for the mixture of polyisocyanate or isothiocyanate monomers and the polythiol monomers is ranging from 4:1 to 30:1 for the obtention of component B.

8. The method of claim 5, wherein the polythiol has formula:

in which n' is an integer from 2 to 6, and R' is an organic group of valency equal to n'.

9. The method of claim 8, wherein the polythiol is selected from the group consisting of pentaerythritol tetrakis mercaptoprionate, 1-(1'mercaptoethylthio)-2, 3-dimercaptopropane, 1-(2'-mercaptopropylthio)-2, 3-dimercaptopropane, 1-(-3'mercaptopropylthio)-2, 3 dimercaptopropane, 1-(-4'mercaptobutylthio)-2, 3 dimercaptopropane, 1-(5'mercaptopentylthio)-2, 3 dimercapto-propane, 1-(6'-mercaptohexylthio)-2, 3-dimercaptopropane, 1, 2-bis(-4'-mercaptobutylthio)-3-mercaptopropane, 1,2-bis (-5'mercaptopentylthio)-3-mercaptopropane, 1,2-bis (-6'-mercaptohexyl)-3-mercaptopropane, 1,2,3-tris (mercaptomethylthio) propane, 1,2, 3-tris (-3'-mercaptopropylthio) propane, 1,2, 3-tris (-2'-mercaptoethylthio) propane, 1, 2, 3-tris (-4'-mercaptobutylthio) propane, 1, 2, 3-tris (-6'-mercaptohexylthio) propane, methanedithiol), 1, 2-ethanedithiol, 1, 1-propanedithiol, 1,2-propanedithiol, 1, 3-propanedithiol, 2, 2-propanedithiol, 1,6-hexanethiol-1, 2, 3-propanetrithiol, and 1,2-bis(-2'-mercaptoethylthio)-3-mercaptopropane.

10. The method of claim 5, wherein the at least one poly (iso) thiocyanate monomer or liquid NCO- or NCS-terminated poly (thio) urethane prepolymer is selected from monomers of formulas:

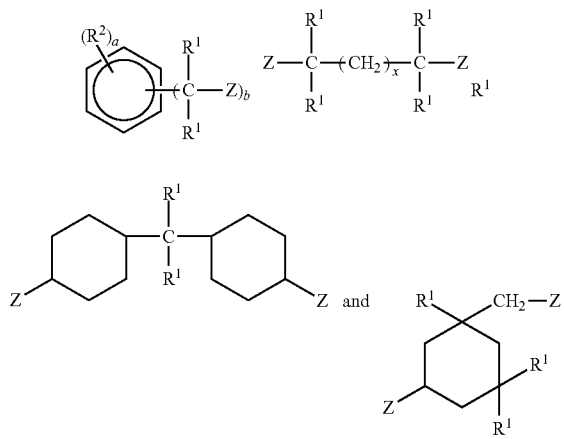

wherein $R^1$ is independently H or a $C_1$-$C_5$ alkyl group;
$R^2$ is H, a halogen, or a $C_1$-$C_5$ alkyl group;
Z is —N=C=X where X is O or S;

a is an integer ranging from 1 to 4, b is an integer ranging from 2 to 4 and a+b≤6 and x is an integer from 1 to 10.

11. The method of claim 10, wherein the polyisocyanate or isothiocyanate is selected from the group consisting of tolylene diisocyanate or diisothiocyanate, phenylene, diisocyanate or diisothiocyanate, ethylphenylene diisoocyanate, isopropyl phenylene diisocyanate or diisothiocyanate, dimethylphenylene diisocyanate or diisothiocyanate, diethylphenylene diisocyanate or diisothiocyanate, diisopropylphenylene diisocyanate or diisothiocyanate, trimethylbenzyl triisocyanate or triisothiocyanate, xylylene diisocyanate or diisothiocyanate, benzyl triiso(thio)cyanate, 4, 4'-diphenyl methane diisocyanate or diisothiocyanate, naphtalene diisocyanate or diisothiocyanate, isophorone diisocyanate or diisothiocyanate, bis (isocyanate or isothiocyanate methyl) cyclohexane, hexamethylene diisocyanate or diisothiocyanate and dicyclohexylmethane diisocyanate or diisothiocyanate.

12. The method of claim 5, wherein the room-temperature polymerizable composition (b) comprises one or more polymerizable episulfide compounds having two or more moieties of formula:

wherein X is S or O.

13. The method of claim 1, wherein the light filtering element is chosen from a polarizing film, a polarizing laminate, a photochromic film, a photochromic laminate, a near infrared filter, a near infrared laminate, a blue cut filter, a blue cut laminate, a microstructured film and a microstructured laminate.

14. The method of claim 1, wherein the catalyst composition consists of a compound chosen from tertiary amines, organometallic compounds, and alkaline metals, alkaline earth metals, transition metals and ammonium salts of acids or mixtures thereof, said ammonium salts fulfilling the condition 0.5≤pka≤14.

* * * * *